United States Patent
Takahashi

(10) Patent No.: US 11,605,823 B2
(45) Date of Patent: Mar. 14, 2023

(54) FUEL CELL SYSTEM

(71) Applicant: TOYOTA JIDOSHA KABUSHIKI KAISHA, Toyota (JP)

(72) Inventor: Yasushi Takahashi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/221,898

(22) Filed: Apr. 5, 2021

(65) Prior Publication Data

US 2021/0376342 A1    Dec. 2, 2021

(30) Foreign Application Priority Data

Jun. 2, 2020   (JP) .............................. JP2020-096261

(51) Int. Cl.
*H01M 8/04119* (2016.01)
*H01M 8/2484* (2016.01)

(52) U.S. Cl.
CPC ..... *H01M 8/04156* (2013.01); *H01M 8/2484* (2016.02)

(58) Field of Classification Search
None
See application file for complete search history.

(56) References Cited

U.S. PATENT DOCUMENTS

2011/0183226 A1    7/2011   Nishiyama et al.

FOREIGN PATENT DOCUMENTS

| JP | 2007-141780 A | 6/2007 |
|----|---------------|--------|
| JP | 2010-177148 A | 8/2010 |
| JP | 2011-171283 A | 9/2011 |
| JP | 2011-175807 A | 9/2011 |

*Primary Examiner* — Sarah A. Slifka
(74) *Attorney, Agent, or Firm* — Finnegan, Henderson, Farabow, Garrett & Dunner, LLP

(57) ABSTRACT

The present disclosure provides a fuel cell system that allows greater convenience and smaller size to be achieved. The fuel cell system of the disclosure comprises a fuel cell module and a liquid water discharge channel for discharge of liquid water in the fuel cell module. The fuel cell module comprises a battery stack, a reactive gas discharge manifold formed so that, during use of the fuel cell system, reactive gas flows from the lower end in the vertical direction to the upper end in the vertical direction, a reactive gas discharge outlet disposed so as to be located at the upper end of the reactive gas discharge manifold in the vertical direction, and a liquid water discharge outlet disposed so as to be located at the lower end of the reactive gas discharge manifold in the vertical direction. The liquid water discharge channel is connected to the liquid water discharge outlet in such a manner that liquid water flows through its interior.

7 Claims, 3 Drawing Sheets

FUEL CELL SYSTEM

FIELD

The present disclosure relates to a fuel cell system.

BACKGROUND

Fuel cell systems are known that generate electricity by chemical reaction between an anode gas such as hydrogen and a cathode gas such as oxygen.

A fuel cell system comprises a fuel cell module having a fuel cell stack obtained by stacking a plurality of fuel cell unit cells together, accessories for supplying and discharging reactive gas such as anode gas and cathode gas to/from the fuel cell module, a reactive gas supply channel, and a reactive gas discharge channel.

Since the cell reaction in the fuel cell module generates water, the cathode gas discharged from the fuel cell module usually contains water vapor or liquid water. Moreover, since the cell reaction in the fuel cell module is carried out while humidifying the reactive gas, the anode gas discharged from the fuel cell module usually also contains water vapor or liquid water.

In a fuel cell system, therefore, retained water can potentially be generated in the reactive gas discharge channel.

In the fuel cell systems disclosed in PTLs 1 to 3, a gas-liquid separator is situated in the anode gas discharge channel that is disposed downstream from the fuel cell module, in order to remove retained water in the anode gas discharge channel.

PTL 3 discloses a solution to the problem in which, when a fuel cell system is mounted in a vehicle and is kept in an inclined orientation with the gas-liquid separator side held upward, drainage cannot be ensured on the side opposite the gas-liquid separator across from the fuel cell module, the solution being to further provide a gas-liquid separator at the location where retained water tends to pool in that orientation.

CITATION LIST

Patent Literature

[PTL 1] Japanese Unexamined Patent Publication No. 2011-175807

[PTL 2] Japanese Unexamined Patent Publication No. 2011-171283

[PTL 3] Japanese Unexamined Patent Publication No. 2010-177148

SUMMARY

Technical Problem

There is a need to provide fuel cell systems with more convenient and smaller designs, for situations that implement the fuel cell systems by mounting them in vehicles such as riding vehicles.

It is an object of this disclosure to provide a fuel cell system that allows greater convenience and smaller size to be achieved.

Solution to Problem

The present inventors have found that the aforementioned object can be achieved by the following means:

<Aspect 1>

A fuel cell system comprising a fuel cell module and a liquid water discharge channel for discharge of liquid water in the fuel cell module, wherein:

the fuel cell module has:

a fuel cell stack in which a plurality of fuel cell unit cells are stacked together, a reactive gas discharge manifold which is formed of mutually linked reactive gas discharge flow holes provided in the plurality of fuel cell unit cells, and is formed so that, during use of the fuel cell system, reactive gas flows from the lower end in the vertical direction to the upper end in the vertical direction, a reactive gas discharge outlet that allows communication between the reactive gas discharge manifold and the exterior of the fuel cell module and, during use, is disposed so as to be located at the upper end of the reactive gas discharge manifold in the vertical direction, and a liquid water discharge outlet that allows communication between the reactive gas discharge manifold and the exterior of the fuel cell module and, during use, is disposed so as to be located at the lower end of the reactive gas discharge manifold in the vertical direction, wherein the liquid water discharge channel is connected to the liquid water discharge outlet in such a manner as to allow the liquid water to flow inside it.

<Aspect 2>

The fuel cell system according to aspect 1, wherein the reactive gas is an anode gas.

<Aspect 3>

The fuel cell system according to aspect 1 or 2, wherein the liquid water discharge channel comprises a draining valve to adjust discharge of liquid water.

<Aspect 4>

The fuel cell system according to any one of aspects 1 to 3, which further comprises a reactive gas supply flow channel and accessories, wherein:

the fuel cell module comprises a reactive gas supply manifold which is formed of mutually linked reactive gas supply flow holes provided in the plurality of fuel cell unit cells, and is formed so that, during use, reactive gas flows from the upper end in the vertical direction to the lower end in the vertical direction, and a reactive gas supply inlet that allows communication between the reactive gas supply manifold and the exterior of the fuel cell module, and during use, is disposed at a location at the upper end in the vertical direction of the reactive gas supply manifold, wherein the reactive gas supply flow channel allows communication between the reactive gas supply inlet and the accessories, and the accessories are disposed at the upper end in the vertical direction of the fuel cell module during use.

<Aspect 5>

The fuel cell system according to aspect 4, wherein:

the accessories consist of a reactive gas supply device and a reactive gas pump, and the reactive gas supply flow channel allows communication between the reactive gas supply device, the reactive gas pump and the reactive gas supply inlet, in that order.

<Aspect 6>

The fuel cell system according to any one of aspects 1 to 5, wherein during use, the fuel cell stack is disposed so that its stacking direction is vertical, or so that the stacking direction is at an inclination from the vertical direction.

<Aspect 7>

The fuel cell system according to aspect 6, wherein the inclination is a slope of 45° or smaller from the vertical direction.

<Aspect 8>

A vehicle in which a fuel cell system according to any one of aspects 1 to 7 is mounted.

Advantageous Effects of Invention

According to the disclosure it is possible to provide a fuel cell system that allows greater convenience and smaller size to be achieved.

DESCRIPTION OF EMBODIMENTS

Embodiments of the disclosure will now be described in detail. The disclosure is not limited to the embodiments described below, however, and various modifications may be implemented which do not depart from the gist thereof.

<Fuel Cell System>

The fuel cell system of the disclosure comprises a fuel cell module and a liquid water discharge channel for discharge of liquid water in the fuel cell module. The fuel cell module has a fuel cell stack in which a plurality of fuel cell unit cells are stacked together, a reactive gas discharge manifold which is formed of mutually linked reactive gas discharge flow holes provided in the plurality of fuel cell unit cells, and formed so that, during use of the fuel cell system, reactive gas flows from the lower end in the vertical direction to the upper end in the vertical direction, a reactive gas discharge outlet that allows communication between the reactive gas discharge manifold and the exterior of the fuel cell module and, during use, is disposed so as to be located at the upper end of the reactive gas discharge manifold in the vertical direction, and a liquid water discharge outlet that allows communication between the reactive gas discharge manifold and the exterior of the fuel cell module and, during use, is disposed so as to be located at the lower end of the reactive gas discharge manifold in the vertical direction. The liquid water discharge channel is connected to the liquid water discharge outlet in such a manner that liquid water flows through its interior.

Figure 1:
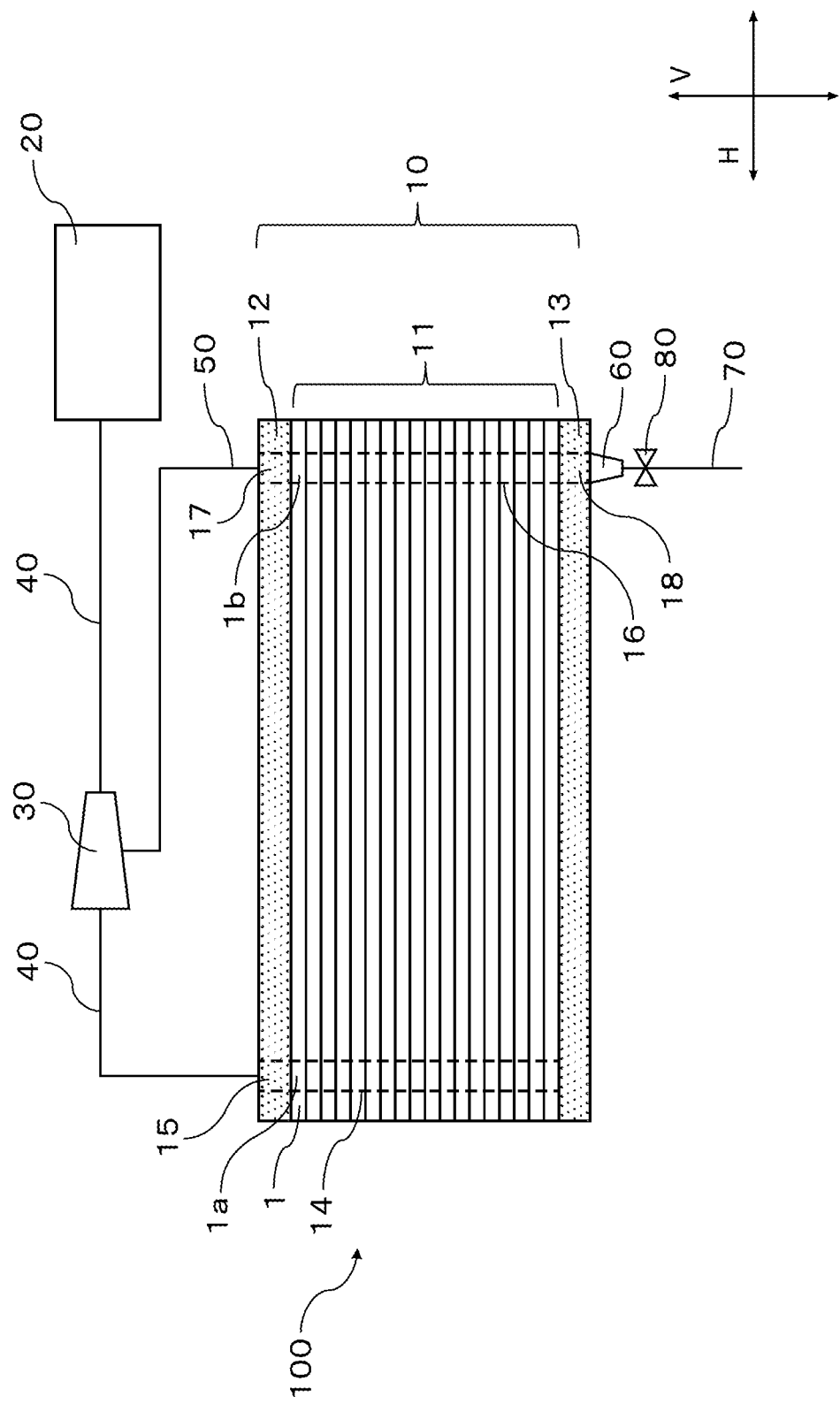
FIG. 1 is a schematic diagram of a fuel cell system 100 according to a first embodiment of the disclosure.
Figure 2:
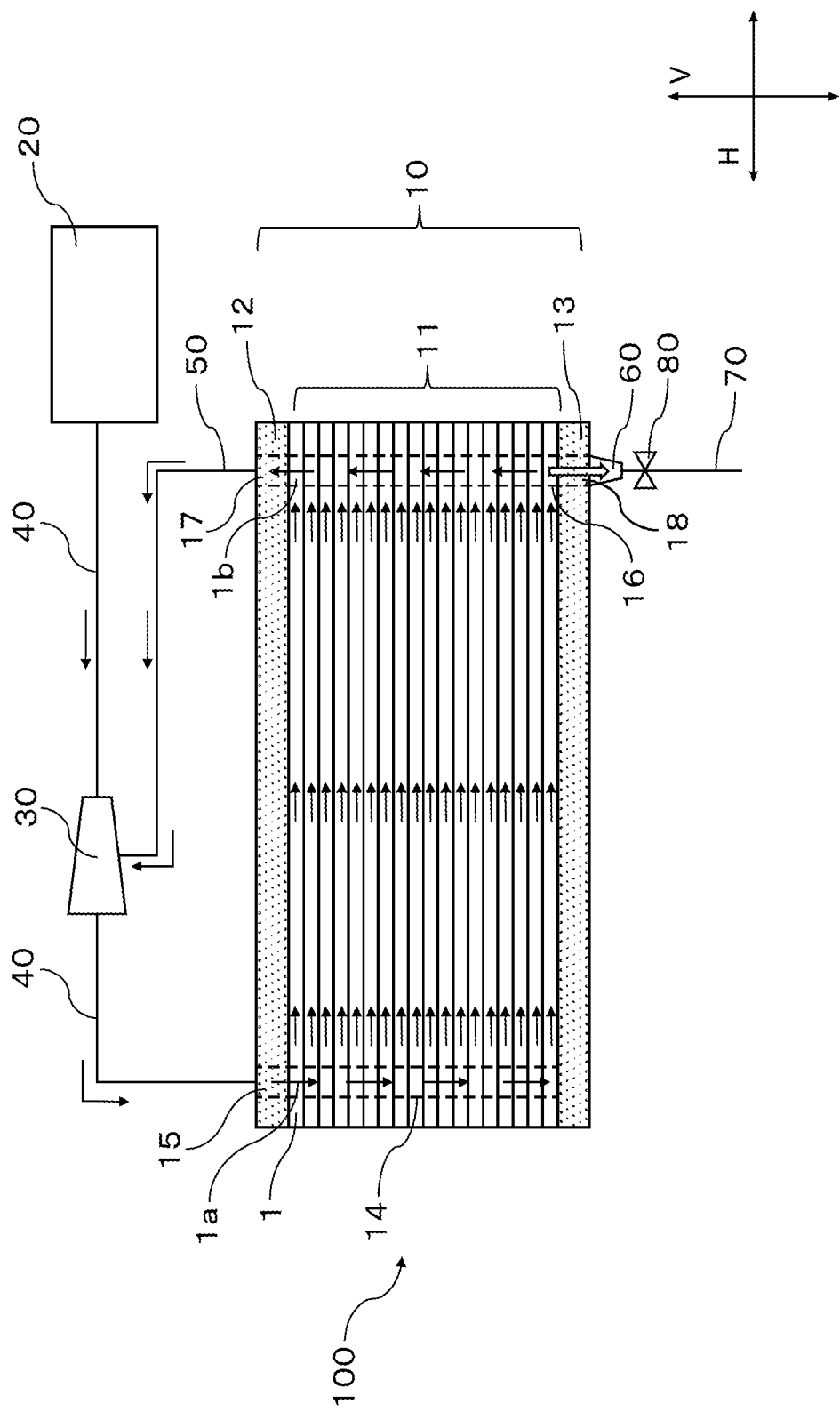
FIG. 2 is a schematic diagram showing the flow of anode gas and liquid water during electric power generation in a fuel cell system 100 according to the first embodiment of the disclosure.

The fuel cell system of the disclosure will now be described in greater detail with reference to FIG. 1 and FIG. 2. FIG. 1 and FIG. 2 show cases where the reactive gas is an anode gas, but the reactive gas in the fuel cell system of the disclosure is not limited to an anode gas. FIGS. 1 and 2 are also not intended to limit the fuel cell system of the disclosure. In FIG. 1 and FIG. 2, the vertical direction is indicated by "V" and the horizontal direction is indicated by "H".

FIG. 1 is a schematic diagram of a fuel cell system 100 according to a first embodiment of the disclosure. As shown in FIG. 1, the fuel cell system 100 according to the first embodiment of the disclosure comprises a fuel cell module 10, an anode gas supply device 20 and an anode gas pump 30 as accessories, an anode gas supply channel 40, an anode gas discharge channel 50, a water storage unit 60, a liquid water discharge channel 70 and a draining valve 80.

The fuel cell module 10 comprises a fuel cell stack 11 in which a plurality of fuel cell unit cells 1 are stacked in the vertical direction V, and end plates 12 and 13 sandwiching both sides of the fuel cell stack 11 in the vertical direction V. The other components of the fuel cell module 10 are not limited and may include, for example, a terminal plate, pressure plate, restraining member and fuel cell case, though these are not depicted in the drawing.

The fuel cell module 10 has an anode gas supply manifold 14, an anode gas supply inlet 15, an anode gas discharge manifold 16, an anode gas discharge outlet 17 and a liquid water discharge outlet 18.

The anode gas supply manifold 14 is formed of mutually linked reactive gas supply flow hole 1a formed in each of the plurality of fuel cell unit cells 1. The anode gas supply manifold 14 is formed so that anode gas flows from the upper end in the vertical direction V to the lower end in the vertical direction V during use of the fuel cell system 100.

The anode gas supply inlet 15 is disposed at the upper end of the anode gas supply manifold 14 in the vertical direction V. The anode gas supply inlet 15 runs through the end plate 12 that is disposed at the upper end of the fuel cell stack 11 in the vertical direction V, allowing communication between the anode gas supply manifold 14 and the anode gas supply channel 40 that is outside the fuel cell module 10.

The anode gas discharge manifold 16 is formed of mutually linked reactive gas discharge flow hole 1b formed in each of the plurality of fuel cell unit cells 1. The anode gas discharge manifold 16 is formed so that anode gas flows from the lower end in the vertical direction V to the upper end in the vertical direction V during use of the fuel cell system 100.

The anode gas discharge outlet 17 is disposed at the upper end in the vertical direction V of the anode gas discharge manifold 16 and runs through the end plate 12 that is disposed at the upper end of the fuel cell stack 11 in the vertical direction V, allowing communication between the anode gas discharge manifold 16 and the anode gas discharge channel 50 that is outside the fuel cell module 10.

The liquid water discharge outlet 18 is disposed at the lower end in the vertical direction V of the anode gas discharge manifold 16 and runs through an end plate 13 that is disposed at the lower end of the fuel cell stack 11 in the vertical direction V, allowing communication between the anode gas discharge manifold 16 and the water storage unit 60 that is disposed outside the fuel cell module 10.

The anode gas supply device 20 is a device that supplies anode gas to the fuel cell module 10, and it may be an anode gas tank, for example. The anode gas pump 30 is a pump for conveying of anode gas to be supplied from the anode gas supply device 20, to the fuel cell module 10.

The anode gas supply channel 40 allows communication between the anode gas supply device 20 and anode gas pump 30 and the anode gas supply inlet 15 of the fuel cell module 10.

The anode gas discharge channel 50 allows communication between the anode gas discharge outlet 17 of the fuel cell module 10 and the anode gas pump 30 that is outside of the fuel cell system 100.

The water storage unit 60 is a space for temporary retention of liquid water that is discharged from the fuel cell module 10.

The liquid water discharge channel 70 allows communication between the water storage unit 60, the fuel cell system 100 and the exterior, and opening and closing of the draining valve 80 allows liquid water retained in the water storage unit 60 to be discharged outside of the fuel cell system 100 as necessary.

FIG. 2 is a schematic diagram showing the flow of anode gas and liquid water during electric power generation in a fuel cell system 100 according to the first embodiment of the disclosure.

As shown in FIG. 2, during electric power generation in the fuel cell system 100 according to the first embodiment of the disclosure, anode gas flows inside the fuel cell system 100 as indicated by the black arrows. As shown in FIG. 2, anode gas supplied from the anode gas supply device 20 flows into the anode gas supply inlet 15 of the fuel cell module 10 through the anode gas supply channel 40, is supplied from the anode gas supply manifold 14 into each fuel cell unit cell 1, and is consumed by cell reaction in each fuel cell unit cell 1. The anode gas may also be humidified with a humidifier (not shown) before being supplied to the fuel cell module 10.

The anode gas that is not consumed by cell reaction in each fuel cell unit cell 1 is discharged from each fuel cell unit cell 1 in a state containing steam and liquid water, and flows through the inside of the anode gas discharge manifold 16 to the anode gas discharge channel 50, being then sent to the anode gas pump 30. The anode gas sent to the anode gas pump 30 is reused for cell reaction.

At the anode gas discharge manifold 16, the anode gas flows from the lower end in the vertical direction V toward the upper end in the vertical direction V, while the liquid water in the anode gas and the steam that has condensed inside the anode gas discharge manifold 16 into liquid water flow inside the anode gas discharge manifold 16 by gravity from the upper end to the lower end in the vertical direction V, as indicated by the white arrow, and are retained in the water storage unit 60. The liquid water retained in the water storage unit 60 flows into the liquid water discharge channel 70 when the draining valve 80 is opened, and is discharged outside of the fuel cell system 100.

In the fuel cell system of the disclosure, as mentioned above, the reactive gas discharge manifold is formed so that, during use of the fuel cell system, reactive gas flows from the lower end in the vertical direction toward the upper end in the vertical direction, and therefore liquid water in the reactive gas in the reactive gas discharge manifold, and steam that has condensed into liquid water, are separated from the reactive gas and discharged out of the fuel cell system through the liquid water discharge channel.

Since gas-liquid separation can thus be carried out in the fuel cell module with the fuel cell system of the disclosure, it is possible to reduce in size and/or to simplify the gas-liquid separator situated in the reactive gas discharge channel, or to eliminate it, thus allowing the fuel cell system to be further reduced in size and/or simplified.

The reactive gas in the fuel cell system of the disclosure may be either anode gas or cathode gas.

For the purpose of this disclosure, "use of the fuel cell system" means electric power generation with the fuel cell system.

<Fuel Cell Module>

In the fuel cell system of the disclosure, the fuel cell module comprises a fuel cell stack, a reactive gas discharge manifold, a reactive gas discharge outlet and a liquid water discharge outlet.

The fuel cell module may also comprise a reactive gas supply manifold, a reactive gas supply inlet and other components. Other components include, but are not limited to, an end plate, a terminal plate and a restraining member.

(Fuel Cell Stack)

The fuel cell stack has a plurality of fuel cell unit cells stacked together.

The number of fuel cell unit cells in the fuel cell stack may be appropriately set by a person skilled in the art according to the purpose of use and the desired performance of the fuel cell module.

The number of fuel cell unit cells in the fuel cell stack may be from 2 to 2000, for example. The number of fuel cell unit cells may be two or more, 50 or more, 200 or more or 500 or more, and 2000 or fewer, 1500 or fewer, 1000 or fewer or 500 or fewer.

During use of the fuel cell system of the disclosure, the fuel cell stack is disposed so that its stacking direction is vertical, or so that the stacking direction is at an inclination from the vertical direction. The inclination may be a slope of 45° or smaller from the vertical direction.

The inclination of the fuel cell stack may therefore be a slope of 0° to 45° from the vertical direction. The inclination of the fuel cell stack may be 0° or greater, 5° or greater, 10° or greater or 15° or greater, and 45° or smaller, 40° or smaller, 35° or smaller or 30° or smaller, from the vertical direction.

Figure 3:
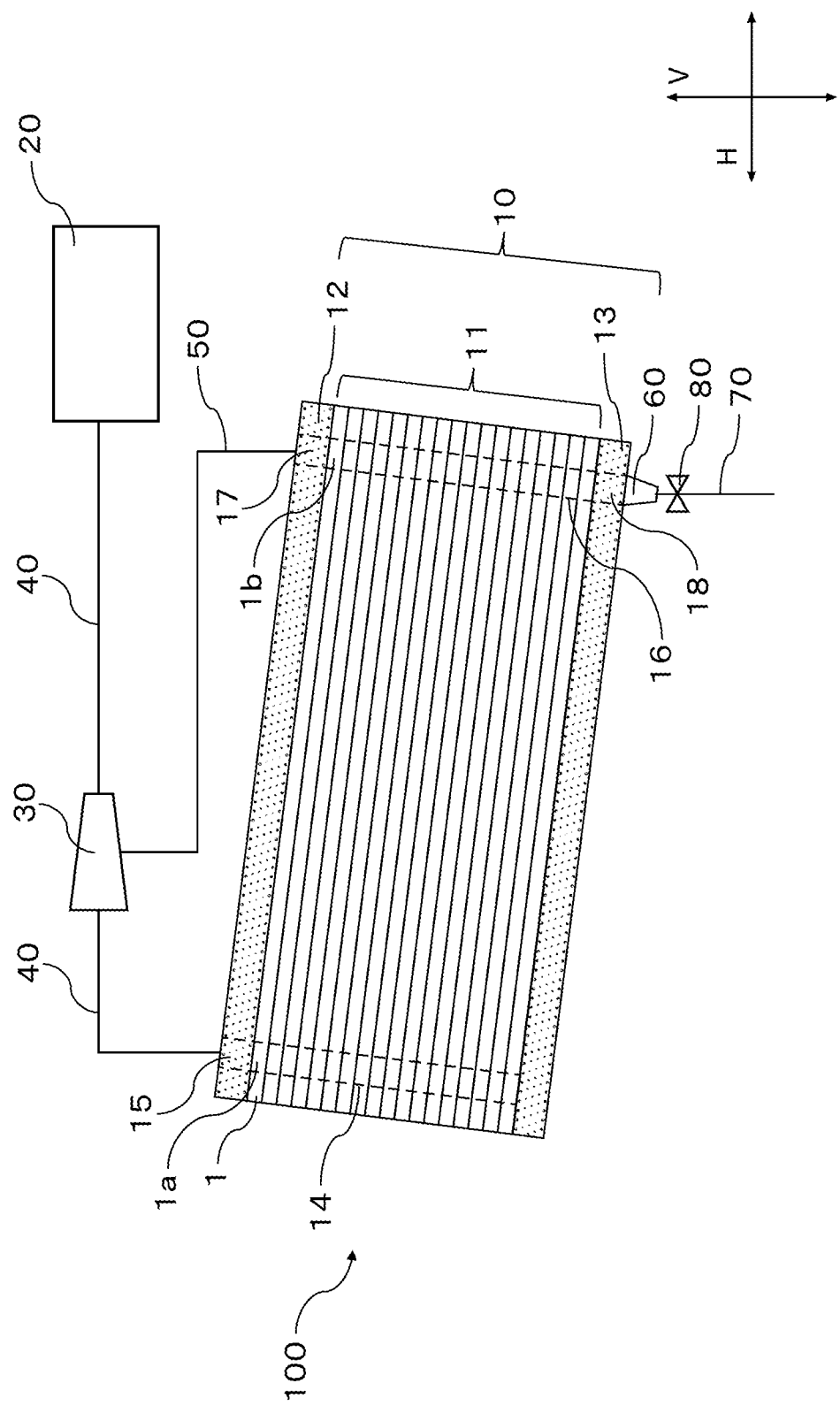
FIG. 3 is a schematic diagram of a fuel cell system 100 according to a second embodiment of the disclosure.

FIG. 3 is a schematic diagram of a fuel cell system 100 according to a second embodiment of the disclosure.

In the fuel cell system 100 according to the second embodiment of the disclosure shown in FIG. 3, the fuel cell stack 11 is at an inclination with respect to the vertical direction V, unlike the fuel cell system 100 of the first embodiment of the disclosure shown in FIG. 1.

The fuel cell unit cells composing the fuel cell stack may be common fuel cell unit cells, and for example, each may have a cathode separator, cathode gas diffusion layer, cathode catalyst electrode layer, electrolyte membrane, anode catalyst electrode layer, anode gas diffusion layer and anode separator, stacked in that order. The stacking direction of the layers is the same as the direction in which the plurality of fuel cell unit cells are stacked in the fuel cell stack, i.e. the stacking direction of the fuel cell stack.

The fuel cell unit cells each have a reactive gas discharge flow hole. The reactive gas discharge flow holes runs through the fuel cell unit cells in the stacking direction. The reactive gas discharge flow holes may also have branching holes allowing communication between the spaces in which the power generating elements of the fuel cell unit cells are housed. The reactive gas discharge flow holes of the plurality of mutually stacked fuel cell unit cells are mutually linked to form a reactive gas discharge manifold.

The fuel cell unit cells may also have reactive gas supply holes. The reactive gas supply flow holes runs through the fuel cell unit cells in the stacking direction. The reactive gas supply flow holes may also have branching holes allowing communication between the spaces in which the power generating elements of the fuel cell unit cells are housed. The reactive gas supply flow holes of the plurality of mutually stacked fuel cell unit cells are mutually linked to form a reactive gas supply manifold.

During use of the fuel cell system, reactive gas passes through the reactive gas supply manifold, passing through the branching holes of the reactive gas supply flow holes to be supplied to the spaces where the power generating elements of the fuel cell unit cells are held, and being partially consumed in the cell reaction. The remainder of the reactive gas that was not consumed in the cell reaction may be discharged through the branching holes of the reactive gas discharge flow holes to the reactive gas discharge manifold, from the spaces where the power generating elements of the fuel cell unit cells are held.

<Reactive Gas Discharge Manifold>

The reactive gas discharge manifold is formed of mutually linked reactive gas discharge flow holes that are provided in the plurality of fuel cell unit cells, formed in mutual linkage.

The reactive gas discharge manifold is formed so that reactive gas flows from the lower end in the vertical direction to the upper end in the vertical direction during use of the fuel cell system. More specifically, the reactive gas discharge manifold may be formed so that, during use of the fuel cell system, reactive gas flows from the lower end in the vertical direction toward the upper end in the vertical direction, along the vertical direction or at an inclination from the vertical direction.

When the direction in which the reactive gas flows is at an inclination with respect to the vertical direction, the inclination may be 0° to 45° from the vertical direction. The inclination of the direction in which the reactive gas flows may be 0° or greater, 5° or greater, 10° or greater or 15° or greater, and 45° or smaller, 40° or smaller, 35° or smaller or 30° or smaller, from the vertical direction.

<Reactive Gas Discharge Outlet>

The reactive gas discharge outlet allows communication between the reactive gas discharge manifold and the exterior of the fuel cell module. The reactive gas discharge outlet is also disposed so that it is located at the upper end of the reactive gas discharge manifold in the vertical direction during use of the fuel cell system.

When the fuel cell module has an end plate, the reactive gas discharge outlet may be a hole running through both sides of the end plate in the stacking direction of the fuel cell stack.

<Liquid Water Discharge Outlet>

The liquid water discharge outlet allows communication between the reactive gas discharge manifold and the exterior of the fuel cell module. The liquid water discharge outlet is also disposed so that it is located at the lower end of the reactive gas discharge manifold in the vertical direction during use of the fuel cell system.

When the fuel cell module has an end plate, the reactive gas discharge outlet may be a hole running through both sides of the end plate in the stacking direction of the fuel cell stack.

<Reactive Gas Supply Manifold>

The reactive gas supply manifold is formed of mutually linked reactive gas supply flow holes that are provided in the plurality of fuel cell unit cells.

The reactive gas supply manifold is formed so that reactive gas flows from the upper end in the vertical direction to the lower end in the vertical direction during use of the fuel cell system. More specifically, the reactive gas supply manifold may be formed so that, during use of the fuel cell system, reactive gas flows from the upper end in the vertical direction toward the lower end in the vertical direction, along the vertical direction or at an inclination from the vertical direction.

When the direction in which the reactive gas flows is at an inclination with respect to the vertical direction, the inclination may be 0° to 45° from the vertical direction. The inclination of the direction in which the reactive gas flows may be 0° or greater, 5° or greater, 10° or greater or 15° or greater, and 45° or smaller, 40° or smaller, 35° or smaller or 30° or smaller, from the vertical direction.

<Reactive Gas Supply Inlet>

The reactive gas supply inlet allows communication between the reactive gas supply manifold and the exterior of the fuel cell module. The reactive gas supply inlet is also disposed so that it is located at the upper end in the vertical direction of the reactive gas supply manifold during use of the fuel cell system.

When the fuel cell module has an end plate, the reactive gas supply inlet may be a hole running through both sides of the end plate in the stacking direction of the fuel cell stack.

<Liquid Water Discharge Channel>

The liquid water discharge channel is a flow channel for discharge of liquid water in the fuel cell module. The liquid water discharge channel is connected to the liquid water discharge outlet in such a manner that liquid water flows through its interior. The liquid water discharge channel allows communication between the liquid water discharge outlet and the exterior of the fuel cell system.

The liquid water discharge channel may also have a draining valve. If the liquid water discharge channel has a draining valve it will be possible to adjust the waste water volume according to the amount of liquid water flowing into the liquid water discharge channel.

The liquid water discharge channel may also have a water storage unit at the upstream end of the draining valve. If the liquid water discharge channel has a water storage unit, then it will be possible to temporarily store liquid water flowing from the reactive gas discharge manifold into the liquid water discharge channel through the liquid water discharge outlet when the fuel cell system is used.

<Reactive Gas Supply Flow Channel and Accessories>

The fuel cell system of the disclosure may also comprise a reactive gas supply flow channel and accessories. The reactive gas supply flow channel may be one that allows communication between the reactive gas supply inlet and the accessories.

The accessories may be a reactive gas supply device and a reactive gas pump. In this case, the reactive gas supply flow channel may be one allowing communication between the reactive gas supply device, the reactive gas pump and the reactive gas supply inlet, in that order. When the reactive gas is an anode gas, the reactive gas supply device may be an anode gas tank, for example. When the reactive gas is a cathode gas, it may be an air intake hole for intake of air from outside of the fuel cell system, for example.

The accessories may be disposed at the upper end in the vertical direction of the fuel cell module during use.

If the accessories are disposed at the upper end in the vertical direction of the fuel cell module during use of the fuel cell system, then when steam that could not be separated by gas-liquid separation in the reactive gas discharge manifold of the fuel cell module condenses inside the reactive gas discharge channel to form liquid water, the liquid water will be unlikely to flow to the accessory side. In addition, since the fuel cell module, which carries a particularly significant portion of the weight of the fuel cell system, is situated at the lower end of the fuel cell system, the center of gravity of the fuel cell system as a whole can be lowered. Lowering the center of gravity of the fuel cell system can improve the running stability when the fuel cell system is mounted in a vehicle, for example.

<Vehicle>

The vehicle of the disclosure has a fuel cell system of the disclosure mounted in it. The vehicle of the disclosure may be a fuel cell-powered automobile that is propelled by the driving force of a fuel cell.

The fuel cell system of the disclosure in a vehicle of the disclosure may be disposed inside a motor room situated at the front of the vehicle.

When accessories are disposed at the upper end in the vertical direction of the fuel cell module of the fuel cell system of the disclosure, the heavy fuel cell module of the fuel cell system will be situated lower than the vehicle. Such a mode can therefore improve the running stability of the vehicle.

REFERENCE SIGNS LIST

1 Fuel cell unit cell
1a Anode gas supply flow hole
1b Anode gas discharge flow hole
10 Fuel cell module
11 Fuel cell stack
12, 13 End plate
14 Anode gas supply manifold
15 Anode gas supply inlet
16 Anode gas discharge manifold
17 Anode gas discharge outlet
18 Liquid water discharge outlet
20 Anode gas supply device
30 Anode gas pump
40 Anode gas supply channel
50 Anode gas discharge channel
60 Water storage unit
70 Liquid water discharge channel
80 Draining valve
100 Fuel cell system

The invention claimed is:

1. A fuel cell system comprising a fuel cell module and a liquid water discharge channel for discharge of liquid water in the fuel cell module, wherein:
the fuel cell module has:
a fuel cell stack in which a plurality of fuel cell unit cells are stacked together,
a reactive gas discharge manifold, which is formed of mutually linked reactive gas discharge flow holes provided in the plurality of fuel cell unit cells, and is formed so that, during use of the fuel cell system, reactive gas flows from the lower end in the vertical direction to the upper end in the vertical direction,
a reactive gas discharge outlet that allows communication between the reactive gas discharge manifold and the exterior of the fuel cell module and, during use, is disposed so as to be located at the upper end of the reactive gas discharge manifold in the vertical direction, and
a liquid water discharge outlet that allows communication between the reactive gas discharge manifold and the exterior of the fuel cell module and, during use, is disposed so as to be located at the lower end of the reactive gas discharge manifold in the vertical direction,
wherein the liquid water discharge channel is connected to the liquid water discharge outlet in such a manner as to allow the liquid water to flow inside it.

2. The fuel cell system according to claim 1, wherein the reactive gas is an anode gas.

3. The fuel cell system according to claim 1, wherein the liquid water discharge channel comprises a draining valve to adjust discharge of liquid water.

4. The fuel cell system according to claim 1, which further comprises a reactive gas supply flow channel and accessories, wherein:
the fuel cell module comprises:
a reactive gas supply manifold which is formed of mutually linked reactive gas supply flow holes provided in the plurality of fuel cell unit cells, and is formed so that, during use, reactive gas flows from the upper end in the vertical direction to the lower end in the vertical direction, and
a reactive gas supply inlet that allows communication between the reactive gas supply manifold and the exterior of the fuel cell module, and during use, is disposed at a location at the upper end in the vertical direction of the reactive gas supply manifold,
wherein the reactive gas supply flow channel allows communication between the reactive gas supply inlet and the accessories,
the accessories are disposed at the upper end in the vertical direction of the fuel cell module during use,
the accessories include a reactive gas supply device and a reactive gas pump, and
the reactive gas supply flow channel allows communication between the reactive gas supply device, the reactive gas pump and the reactive gas supply inlet, in that order.

5. The fuel cell system according to claim 1, wherein during use, the fuel cell stack is disposed so that its stacking direction is vertical, or so that the stacking direction is at an inclination from the vertical direction.

6. The fuel cell system according to claim 5, wherein the inclination is a slope of 45° or smaller from the vertical direction.

7. A vehicle in which a fuel cell system according to claim 1 is mounted.

* * * * *